United States Patent
Dentzer et al.

(10) Patent No.: US 10,346,418 B2
(45) Date of Patent: Jul. 9, 2019

(54) OPTIMIZING DATA ACCESS BASED ON DATA AGING

(71) Applicant: SAP SE, Walldorf (DE)

(72) Inventors: Ralf Dentzer, Hockenheim (DE); Axel Herbst, Eppingen (DE)

(73) Assignee: SAP SE, Walldorf (DE)

( * ) Notice: Subject to any disclaimer, the term of this patent is extended or adjusted under 35 U.S.C. 154(b) by 326 days.

(21) Appl. No.: 15/382,286

(22) Filed: Dec. 16, 2016

(65) Prior Publication Data

US 2018/0173771 A1   Jun. 21, 2018

(51) Int. Cl.
  *G06F 17/30* (2006.01)
  *G06F 16/2458* (2019.01)
  *G06F 16/22* (2019.01)
  *G06F 16/21* (2019.01)

(52) U.S. Cl.
  CPC ........ *G06F 16/2477* (2019.01); *G06F 16/21* (2019.01); *G06F 16/221* (2019.01); *G06F 16/2291* (2019.01)

(58) Field of Classification Search
  CPC .... G06F 17/30501; G06F 17/30; G06F 16/21; G06F 16/2291; G06F 16/2477; G06F 16/221
  USPC .......................................................... 707/746
  See application file for complete search history.

(56) References Cited

U.S. PATENT DOCUMENTS

| | | | |
|---|---|---|---|
| 5,544,355 A * | 8/1996 | Chaudhuri | G06F 16/24542 707/704 |
| 7,082,600 B1 * | 7/2006 | Rau | G06F 9/44563 717/140 |
| 7,516,103 B1 * | 4/2009 | Peitrucha, Jr. | G06Q 30/02 705/56 |
| 2011/0264625 A1 * | 10/2011 | Samudrala | G06F 17/30 |
| 2012/0150791 A1 * | 6/2012 | Wilson | G06F 17/30 |
| 2013/0198165 A1 * | 8/2013 | Cheng | G06F 17/30 |
| 2014/0365424 A1 * | 12/2014 | Herbst | G06F 17/30501 |
| 2016/0092555 A1 | 3/2016 | Hegde et al. | |

FOREIGN PATENT DOCUMENTS

EP    2857993 A1    4/2015

OTHER PUBLICATIONS

"European Application Serial No. 17001958.2, Extended European Search Report dated Feb. 26, 2018", 8 pgs.

* cited by examiner

*Primary Examiner* — Shahid A Alam
(74) *Attorney, Agent, or Firm* — Schwegman Lundberg & Woessner, P.A.

(57) ABSTRACT

A database includes a plurality of partitions with respective partition dates. A query is received for data from a view of the database, the query containing a filtering parameter for retrieval of the data. A definition of the view is analyzed to determine a table of the database that contributes to the view and an aging object associated with the table. A restriction rule associated with the aging object is identified, for example, based on an annotation in the definition of the view. A restriction date for the aging object is determined based on the restriction rule. A partition, from the plurality of partitions, is selected based on the partition date of the partition being equal to or later than the restriction date. The queried data is retrieved from the selected partition according to the filtering parameter and a response to the query is generated based on the retrieved data.

20 Claims, 7 Drawing Sheets

OPTIMIZING DATA ACCESS BASED ON DATA AGING

TECHNICAL FIELD

The present disclosure relates generally to data processing and, in particular embodiments, to leveraging a database aging functionality to optimize access to data from the database.

BACKGROUND

An enterprise may employ a variety of software applications and/or services in the course of its operations. These software applications and/or services may be used to accomplish a variety of enterprise tasks and may be used in conjunction with one or more back-end systems, e.g., servers, databases, etc. The back-end systems may store enterprise data such as, for example, business objects and other business data, as well as logic for manipulating the enterprise data, such as transactional logic or other business logic. In order to accomplish the enterprise operations, the software applications and/or services may need to access the stored enterprise data from a database of the back-end system. The back-end system may employ, for example, the SAP HANA Database, which is a column-oriented, in-memory database available from SAP AG, Walldorf, Germany. The database may communicate with an application through a database management system (DBMS). The database may also be in communication with a plurality of different storage media exhibiting different characteristics (e.g., speed, cost, reliability, energy consumption).

The enterprise data may be stored in a database with a data aging functionality that stores data in a specific partition of the database based on an "aging date" associated with the data and a corresponding partition date (or partition date range) associated with the partition. The database may also include other data segregation functionalities such as for storing the enterprise data according to a current status (e.g., pending or closed) of the data, and/or any other values that can be used to segregate the data into separate partitions of the database. For example, data that has a recent aging date (e.g., less than a year) and/or has an "aging value" of "pending", e.g., business-relevant (or "current") data, may be stored in faster, more expensive storage media that may be quickly accessed, and data that has an older aging date (e.g., more than a year) or has an aging value of "closed", e.g., non-relevant (or "historical") data, may be stored in slower, less expensive storage media. Accordingly, the enterprise data may be stored in separate partitions of a database according to a storage hierarchy so that it may be easily accessed. The aging date/value of a data record may be assigned based on the logic of rules (e.g., business rules) for manipulating a software object (e.g., business object) that refers to the data record.

The purpose of data aging is to reduce the memory footprint of software applications that access the age-segregated data in order to reduce the system load, for example, by storing historical transactional data in slower/cheaper partitions of the database in an online transaction processing (OLTP) environment. Although the data may be stored redundantly at different levels (e.g., partitions) of a storage hierarchy (e.g., database system), the cost of storing the data may be optimized by storing only the most current data in the top level(s) of the storage hierarchy. After an aging date/value has been assigned to particular software object data (e.g., a data record) and an appropriate storage location (e.g., database partition) has been determined, the data may be appropriately queried/accessed. However, given the multiple aging dates/values of the stored data, it may be difficult to determine how to optimally access data from several different storage levels, so that data queries do not necessarily load or even process data having an older aging date/value if such data would not contribute to the result set of the query.

Rules (e.g., business rules) may be applied to the data in order to ensure that all data records that are related to each other, from a holistic perspective of the rules, may only be stored within the same (and/or a higher level for newer data) of the storage hierarchy. Software objects comprising related pieces of data may be stored in the database across different data structures (e.g., tables). In this way, tables of records that are linked together by "relationships" may be stored separately while still allowing a user to make complex queries against the database in an efficient manner. Therefore, a query for data associated with a same software object (as manipulated by the rules) will return the full result sets from a rules perspective. Structured Query Language (SQL) is a standardized language for creating and operating on such "relational" databases. However, how far into the historical data a query should reach may not always be clear before the query is executed.

BRIEF DESCRIPTION OF DRAWINGS

The present disclosure is illustrated by way of example and not limitation in the figures of the accompanying drawings, in which like references indicate similar elements and in which.

DETAILED DESCRIPTION

Figure 1:
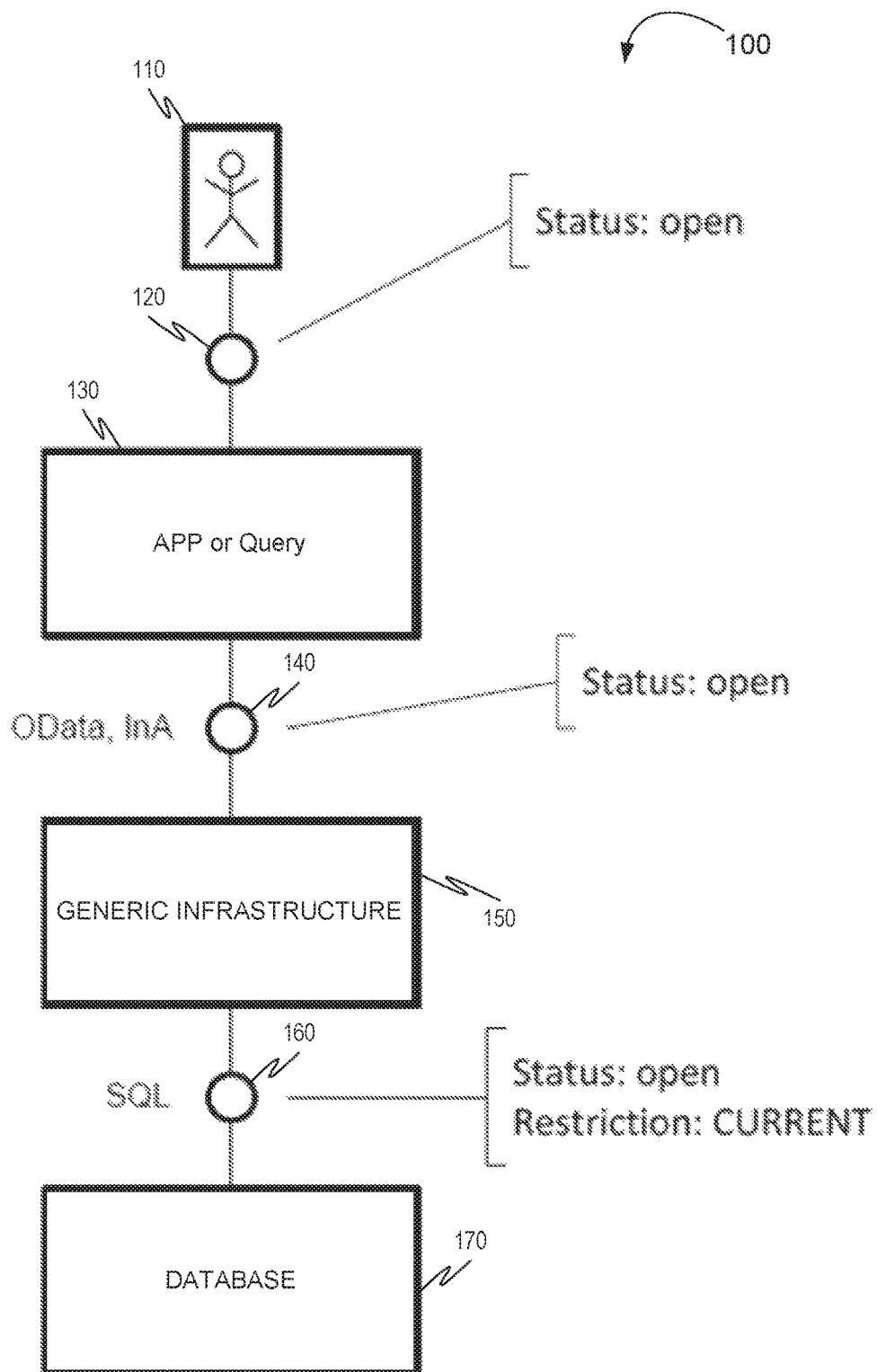
FIG. 1 is a high-level block diagram of a data flow of a system, consistent with some embodiments, configured to optimize data access based on a database data aging functionality.

A conventional approach to accessing data from a database with a data aging functionality involves a user specifying whether historical data is to be considered or not in response to a user query. However, this is not optimal since the user is typically not aware of the logic (e.g., checks, criteria, etc.) that lead to data aging, let alone any aging date/value that has been assigned to the data and is therefore not able to identify whether historical data needs to be considered. Such a reliance on the user may lead to the query not reaching the data the user requested (e.g., the user may be forced to re-run the query with an earlier aging date), performance penalties resulting from unnecessary evaluation of data stored in slower partitions, and processing of a higher than needed data volume. Thus, the conventional approach fails to provide data access that may avoid (content-wise) unnecessary data load and processing costs without placing a decision burden on the end users regarding whether to access historical data.

In example embodiments described herein, an optimized data access may be achieved by leveraging the fact that historical data is transferred from a fast/expensive in-memory store of a main node of the database to a slower/cheaper storage medium. e.g., on a disk. As noted above, the data that remains in main memory may be referred to as current data (or hot data in older terminology), and the data moved out of main memory is called historical data (or cold data in older terminology). The data aging functionality may be leveraged to achieve performance improvements by restricting access to historical data during data retrieval; in other words, the retrieval of data that was moved out of the main memory may be avoided if the data is not needed to respond to a user query.

As noted above, a database may be divided into separate partitions for storing data with different associated aging dates/values based on partition dates (or partition date ranges) associated with each partition. A special partition (e.g., denoted as '0000' partition) may hold all current data and additional partitions may be created for data with aging dates/values corresponding to earlier date periods or value ranges, for example, yearly partitions. These additional partitions hold historical data which may be stored on a slower medium such as a disk. Alternatively, the historical data could also reside in separate in-memory nodes or even in separate databases in a dynamic tier-based setup. The rows of an aging table (e.g., a table that is configured for data aging) are distributed to these partitions according to their assigned aging date/value. In an embodiment, this distribution to partitions is controlled by a special date column of a table referred to as the partitioning column (or aging partitioning column) of the table. Rows with a partitioning column value of "0000-00-00" belong to the current partition; other rows of the partitioning column belong to historical partitions according to the respective date value of the partitioning column for each row.

An aging run is a regularly executed job that examines tables of active aging objects (e.g., active groups of related tables), determines current records that are mature enough according to: a configured data residence period, satisfaction of conditions as part of aging rules, fulfillment of application and process-specific checks (e.g. status value, document predecessor existence), and/or passing any veto checks for aging; and sets an aging date/value if the records qualify. The database moves the records to the corresponding historical partitions on update of the partitioning column in a scheduled aging run. The partitioning column does not have its own application rules/semantics for determining the values in the column; therefore, upon creation, records have an initial value of "0000-00-00" in their corresponding row of the partitioning column and are initially created in the current (e.g., 0000) partition.

The movement of data to historical partitions may be controlled by application-specific aging logic and executed by regularly scheduled aging runs. The aging runs may first determine the age of a row of a table based on one (or several) date columns in the table. Often a single age reference date is available and used to calculate the age of the record. An age reference date column of the table includes application semantics that may be used as a reference for the calculation of the age of the row according to an aging rule. For example, during the aging run, the age reference date at each row of the age reference date column may be copied to the corresponding row of the partitioning column of the table. The aging run may then select rows of the table that are older than a specified residence period, e.g., older than a year. The aging run may then process application-specific veto checks (e.g., according to an aging rule) that may prevent the movement of data to historical partitions. For example, rows with status "open" instead of "closed" (e.g., in a status column) may always be kept in the current partition. The aging run may then update the partitioning column of the table with a value determined from the semantic date columns of the application (e.g., age reference date column). As noted above, this may simply entail copying the value of an "age reference date" to a corresponding row of the partitioning column. Finally, the aging run may update the aging statistics for the table; in particular, the maximum value of the partitioning column may be stored for the table.

The main challenge of data aging is the performance impact, which may be substantial, for accessing historical data from a slower storage medium. Therefore, in order to optimize data access, accessing historical data may be avoided if it is not needed for a correct result. If a user, for example, wants to see a list of rows with a status of "open" and there is an aging rule that rows with status "open" are kept in the current partition, then it is sufficient to retrieve only current data for responding to the user. Unfortunately, most databases cannot decide automatically if a search on historical data is necessary to answer a user request, e.g., query. Instead, the caller (e.g., consumer of a request) "a priori" has to decide which data is needed and add an appropriate clause to the request. This could either be a "where condition" on the partitioning column, or a new SQL syntax element "with range_restriction ( )". In Advanced Business Application Programming (ABAP) applications, the range restriction may be set by specific APIs. For example:

```
select * from atab1 where __DATAAGING = '00000000';
select * from atab1 where __DATAAGING >= '20150101' or
__DATAAGING = '00000000';
DATA(lr_session_control) =
cl_abap_session_temperature=>get_session_control( ).
lr_session_control->set_hot( ).
cl_abap_stack_temperature=>set_hot( ).
lr_session_control->set_temperature( im_temperature = '20150101').
cl_abap_stack_temperature=>set_temperature( im_temperature =
'20150101' ).
```

For generic applications or analytics based on database views (e.g., a combination of application data distributed over several tables) such an a priori decision regarding the need to access historical data is difficult for several reasons. The full context of a request may not be well known, with only database view names and any filters (e.g., parameters) provided with the request. This known context, e.g., database view name and available filters on semantical columns, may be translated to a technical restriction to be provided to the database together with the request for data. Views may be defined across application areas and touch multiple aging objects, and free combinations of aging tables, e.g., via joins, are possible in a user query. Therefore, the restriction may not exclude data of a table that is needed to properly execute the joins or other view-building logic.

Example Design Overview

FIG. 1 is a high-level block diagram of a data flow of a system 100, consistent with some embodiments, configured to optimize data access based on a database data aging functionality.

The overall setup of system 100 consists of an application (e.g., an SAP Fiori application ported to a mobile device) or an analytical query tool 130 that is executed in an analytical frontend. The system 100 further includes a generic infrastructure 150 which may be an analytical engine (e.g., of the analytical frontend) or an advanced business application programming (ABAP) application infrastructure, and a database 170. e.g., an SAP HANA database. In an embodiment, generic infrastructure 150 may form part of the database 170, for example, as an "upper layer" of database 170 that may translate a received request for data into a "lower level" request (e.g., an SQL request). Based on a user 110 wanting to view some data or analytical figure from database 170, the user 110 starts an application or query tool 130 and optionally provides filters 120 for data selection from the database 170. The application or query tool 130 accepts input from the user 110 and sends a query 140 in the open data (OData) protocol or, in the case of analytical frontends, in the Info Access (InA) protocol to the generic infrastructure 150. The generic infrastructure 150 interprets the query 140, translates it to a SQL statement on one or more corresponding database views (e.g., of database 170), and transmits the translated request 160 to the database 170.

In an embodiment, the user 110 wants to see a list of open sales orders; therefore, the user 110 opens a suitable application or query tool 130 and specifies a filter 120 on the sales order status, e.g., status=open. The application or query tool 130 (e.g., the front-end) transmits a query 140 for a sales order entity set from a corresponding OData service with the filter 120 on the sales order status. The generic infrastructure 150 selects, from the corresponding database views, a consumption view with the filter 120 in the where clause, e.g., where status=open. Without an explicit restriction to a particular time period of data (e.g., by user 110), the database 170 would search through all stored data for open sales orders. However, in constructing the request 160, the system 100 may leverage the known business logic of sales orders, which provides for a veto check in an aging run for sales orders, thereby preventing the aging of open orders. Therefore, a restriction of the request 160 to current data (e.g., data that has not been aged in an aging run) is possible and would speed up performance without missing any of the data from database 170 that is needed to respond to the query 140 from the user 110.

In an embodiment, the user 110 wants to see a sum of all sales order values for the current year. The user 110 opens an appropriate application or query tool 130 and specifies (e.g., as filter 120) January 1st of the current year as a lower bound for the sales order creation date. The application or query tool 130 sends a query 140 for an aggregated (e.g., sum of all) query result with the given lower boundary on the creation date, via the InA protocol, from the generic infrastructure 150, e.g., an analytical engine. The generic infrastructure 150 selects an aggregated result from the corresponding database view (e.g., a cube view) with the date boundary in the where condition, e.g., where creation date>='20160101'. As noted above, without an explicit restriction from user 110, the database 170 would search all of its data for records with creation date greater or equal to January 1st. However, an aging logic of sales orders (e.g., based on the business logic of sales orders) uses the creation date of a sales order as a partitioning date for historical records associated with the sales order. Therefore, Jan. 1, 2016 may be used as a "restriction date" for restricting access to aged data in database 170 to partitions of database 170 with associated partition dates (or partition date ranges) that are equal to or later than the restriction date. Moreover, aging statistics written during aging runs provide a maximum (e.g., most recent) partition date of all historical records, e.g., the current partition of database 170. If this most recent partition date is earlier than January 1st, an SQL select on current data (e.g., the current partition of database 170) is sufficient and would speed up performance without missing any of the data from database 170 that is needed to respond to query 140 from the user 110.

In this way, the user 110 may specify filter 120 values for columns of the corresponding database views with proper business semantics (e.g., based on a sales order business logic) from which a restriction (e.g., for an SQL select as part of request 160) to access aged data from database 170 may be formulated. Furthermore, in order to ensure use of these columns in the query 140 from user 110, the columns may be made mandatory in the user interface of application or query tool 130, and the filters 120 for these columns may be pre-filled with suitable default values. The suitable default values may be chosen to ensure good response times while allowing the user 110 to change the default values for the filters 120, e.g., to see more data from database 170. Importantly, the user 110 is not confronted with a decision regarding a technical partition date of partitions of database 170 or even with the concept of current and historical data resulting from data aging in database 170.

Example System Architecture

Figure 2:
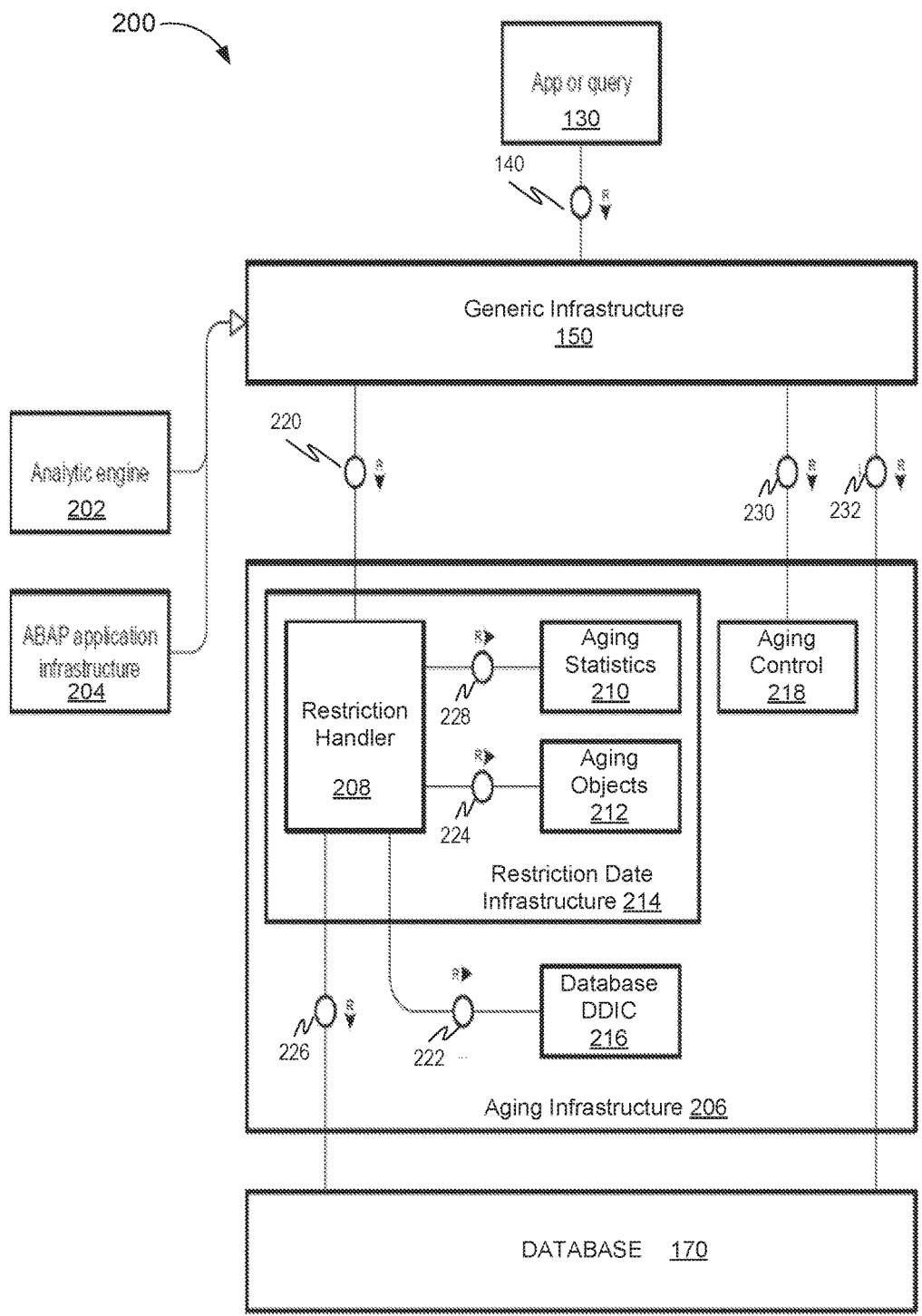
FIG. 2 is a block diagram of a data flow of a system, consistent with some embodiments, configured to optimize data access based on a database data aging functionality.

FIG. 2 is a block diagram of a data flow of a system 200, consistent with some embodiments, configured to optimize data access based on a database data aging functionality. The elements in FIG. 2 include elements from FIG. 1, which elements are labeled with the same identifiers.

The system 200 includes a database 170 that includes a plurality of partitions with respective partition dates (or partition date ranges), as noted above, with respect to a data aging functionality (e.g., aging runs) of the database 170. The system 200 includes an application or query tool 130 for transmitting a query 140 (e.g., in OData or InA protocol) for data from a view of the database 170 to a generic infrastructure 150, the query 140 containing at least one filter 120 (e.g., filtering parameter=order status) for retrieval of the data from database 170. As noted above, the generic infrastructure 150 may include an analytic engine 202 or an ABAP application infrastructure 204. In the example of FIG. 2, the generic infrastructure 150 (or the database 170) includes an aging infrastructure 206 that includes a restriction date infrastructure 214, a database data dictionary (DDIC) 216 associated with database 170, and an aging control 218.

The generic infrastructure 150 transmits a request 220 for a data access restriction date from the restriction handler 208 of restriction date infrastructure 214. The request 220 specifies: the database views (of database 170) from which data is to be requested (e.g., in a single SQL select), select-options for fields of the database views (e.g., connections via "AND" semantics), and any view associations used to form the request 220. The restriction handler 208 then analyzes 222 definitions of each of the views in the database DDIC 216 to determine the tables of the database 170 that contribute to each of the views and identify any metadata (e.g., annotations) in the definitions of the views.

The restriction handler 208 then determines 224 which of the tables of a view are aging tables, their respective aging objects 212 (e.g., a sales order aging object), and whether these respective aging objects 212 are active, e.g., sales order status=open. The restriction handler 208 then identifies (e.g., based on the annotations of the views) restriction rules (e.g., defined as restriction rule views of the database 170) associated with the respective aging objects 212 and transmits a request 226 to the database 170 to execute the identified restriction rule views. The execution of the restriction rule views in database 170 provides a restriction date as explained below with respect to methods described herein. The restriction handler 208 may then use 228 aging statistics 210 to optimize the restriction date, e.g., if the restriction date is more recent than the most recent partition date of a partition (e.g., current data partition) of database 170, then a restriction date equal to the most recent partition date will be sufficient to respond to the query 140.

The generic infrastructure 150 then uses 230 aging control 218 to set the restriction date used to select at least one partition, from the plurality of partitions of database 170, based on the respective partition dates of the selected partitions being equal to or later than the optimized restriction date. Finally the generic infrastructure 150 retrieves 232 the data from the selected partitions according to the filter 120 of query 140 and responds to the query 140 with the retrieved data.

Example Data Structures

The following descriptions of data structures refer to elements from FIG. 1 and FIG. 2, which elements are referred to using the same identifiers. A restriction rule for accessing data from database 170 may rely on the aging logic and partition setup of an individual aging object 212. Since database views may select data from multiple aging objects 212, the identification of restriction rules for each of the multiple aging objects 212 is important. A restriction rule of a given aging object associated with a database view may be formalized as follows: the restriction rule takes the available filters 120 (e.g., from a query 140) and returns a rule minimal date or "rule earliest date". The rule minimal date is an (inclusive) lower boundary for a restriction date used to select dated partitions including historical data that would pass the filters 120. The restriction rule may be considered an assertion that all view rows that pass the given filters 120 are not based on historical data of aging tables of the rule's aging object having a lower (earlier) partitioning date than the rule minimal date.

The definitions of the views in the database DDIC 216 of FIG. 2 may include annotations indicating date columns of the views, the date columns specifying an aging date of each instance of the aging objects 212. For example, a date column (LastChangeDate) may be marked in an analytical database view by an annotation as follows:

```
define view SalesOrderItemCube as
    <omitted>
    @DataAging.ageReferenceDateForAgingObject : [ 'EPM_SO' ]
    LastChangeDate,
    <omitted>
Based on a typical query 140 from user 110:
    select * from SalesOrderItemCube
        where LastChangeDate >= '20160101',
``` the following data access restriction logic may be applied. The date 2016-01-01 of the where condition (e.g., filter 120) may be used as a lower boundary for the restriction date used to select partitions of database 170 (e.g., via comparison to respective partition dates of the partitions) to search in responding to query 140. Therefore, it is sufficient to read partitions of database 170 with a partition date of 2016 Jan. 1 or more recent, including a current partition. The most recent partition date per aging object 212 (EPM_SO in the above example) of data in aged (e.g., historical) partitions of database 170 is known from aging statistics 210. This allows for an optimization of a data access restriction date: if the oldest requested date 2016-01-01 is more recent than the most recent partition date of historical partitions, it is sufficient to read the current partition of database 170 to formulate a complete response to query 140.

Therefore, the restriction handler 208 interprets any annotations (e.g., indicating date columns of the views) and executes each restriction rule generically. If a filter 120 on an annotated column of the view is available (e.g., expressed as select-option), a minimum date described by the select-option may be used as the rule minimal date, and if no filter 120 is available (e.g., from query 140), then the lowest (e.g., oldest) date 0001-01-01 is used. The result of executing the restriction rule is a pair (AgingObject, RuleMinimalDate) that may be combined with the results of execution of other restriction rules, as described below. The execution of the restriction rule is only possible if an appropriate age reference date column exists in the view, e.g., as identified by an annotation of the reference date column in the definition of the view in database DDIC 216.

The aging objects 212 of FIG. 2 may be business objects and the restriction rules associated with these aging objects 212 may be based on the logic of a business rule associated with the business object. For example, a restriction rule may be based on an aging rule, specified by an annotation of a view definition in the database DDIC 216, since the logic for an a priori restriction of access to historical data may be an inversion of the logic (aging rule) applied during aging runs that selects rows (e.g., of a table that contributes to the view) for movement to historical partitions of database 170. A restriction rule view is a database view (e.g., on database 170) having all columns listed in an annotation of the view and an additional mandatory column "DataAgingRelevantDate". The restriction rule view may optionally include some parameters passed from the database view.

In the following example, the annotation corresponds to the view column SalesOrderLifeCycleStatus. and specifies the restriction rule view SalesOrderStatusAgingRule for the restriction rule:

```
@DataAging.restrictionRuleViewForAgingObject : [
    { agingObject : 'EPM_SO',
        usedColumns : [ 'SalesOrderLifeCycleStatus' ],
        ruleView :  'SalesOrderStatusAgingRule' }
]
define view SalesOrderItemCube as
    <omitted>
    SalesOrderLifeCycleStatus,
    <omitted>
```

The restriction rule view represents the business rule that only closed or canceled sales orders may be aged, while orders new or in process are always kept in the current partition. It may be defined (e.g., in database DDIC 216) as follows:

```
define view SalesOrderStatusAgingRule
    as select from SlsOrdLifeCycleStatus
{
    key SalesOrderLifeCycleStatus,
    case SalesOrderLifeCycleStatus
        when 'C' then '00010101'    // Closed
        when 'X' then '00010101'    // Canceled
        else         '99991231'     // N = New or P = In process
    end as DataAgingRelevantDate
}.
```

A typical query 140 from user 110 may request all new or in process sales orders:
    select * from SalesOrderItemCube
        where SalesOrderLifeCycleStatus='N'
        or SalesOrderLifeCycleStatus='P'
Execution of the rule view (e.g., by the restriction handler 208) with a where condition derived from the where condition (e.g., filter 120) of the user request:
    select min(DataAgingRelevantDate) as MinimalDate
        from SalesOrderStatusAgingRule
        where SalesOrderLifeCycleStatus='N'
        or SalesOrderLifeCycleStatus='P'
The resulting MinimalDate (e.g., earliest date, in the example: 99991231) may be determined as the minimum of the column "DataAgingRelevantDate", after application of the filter 120 is used as a lower boundary for the restriction date when selecting from historical partitions of database 170 in order to respond to the query 140. Therefore, in the present example, only the current data partition (known, e.g., from aging statistics 210) is selected for search.

The result of executing the restriction rule view is a pair (AgingObject, RuleMinimalDate) that may be combined with the results of execution of other restriction rules, as described below. A database rule view may be defined independently from the view using it in a restriction rule annotation (e.g., in the definition of the view in database DDIC 216), as long as the field names are the same in the view and the restriction rule view. Therefore restriction rule views may be easily reused in multiple database view annotations; enabling further database views for data aging may be achieved by simply using annotations, thus limiting development effort.

Restriction rules for accessing data from database 170 may be combined in a conservative manner in order to search the least number of partitions while still searching all of the data relevant to a query 140 from user 110. A database view may have multiple associated restriction rules per aging object 212 with respective rule minimal dates. Since the select-options (e.g., filters 120) for different columns are combined by a logical "AND", the rule minimal dates determined via execution of the restriction rules may also be combined by a logical "AND". Therefore the effective minimal date (e.g., the restriction date) is the maximum of all the rule minimal dates, or the highest or latest of all rule minimal dates. This maximum is the restriction date for the aging object 212 so that historical data before this restriction date are not relevant for responding to the query 140 on the database view.

For example, consider the following query 140:
    select * from SalesOrderItemCube
        where SalesOrderLifeCycleStatus='C'
        and LastChangeDate>='20160101'
Here, the restriction handler 208 will determine minimal dates for both conditions:
    LastChangeDate>='20160101' determines a lower boundary 2016-01-01 for the restriction date; and
    SalesOrderLifeCycleStatus='C' triggers execution of the rule view and determines a lower boundary 0001-01-01 for the restriction date.

These two conditions may be combined, and the maximum (or latest or most recent) of the boundary dates is taken, i.e., 2016-01-01, for the restriction date. In this way, multiple restriction rules per view may be combined and executed to determine an optimal boundary for the restriction date.

During each aging run, the maximum (or highest or latest) partitioning date of historical data is recorded per aging object 212 in aging statistics 210. This maximum (or highest or latest or most recent) partitioning date may be used to improve the minimal date of an aging object 212. The maximum partitioning date is read via an API of the aging infrastructure 206. If the minimal date for an aging object 212 is later than the maximum partitioning date, it is sufficient to access current data only for this aging object 212 when generating a response to a query 140 on a database view that includes data from the aging object 212. A restriction, per aging object 212, for reading all relevant rows of tables that contribute to the view is therefore given by the following formula (1):

$$\text{statistics\_optimization}(\max_{rules}(\min_{filtered\ rule\ rows}(\text{DataAgingRelevant date}))).$$

Example Methods

Figure 3:
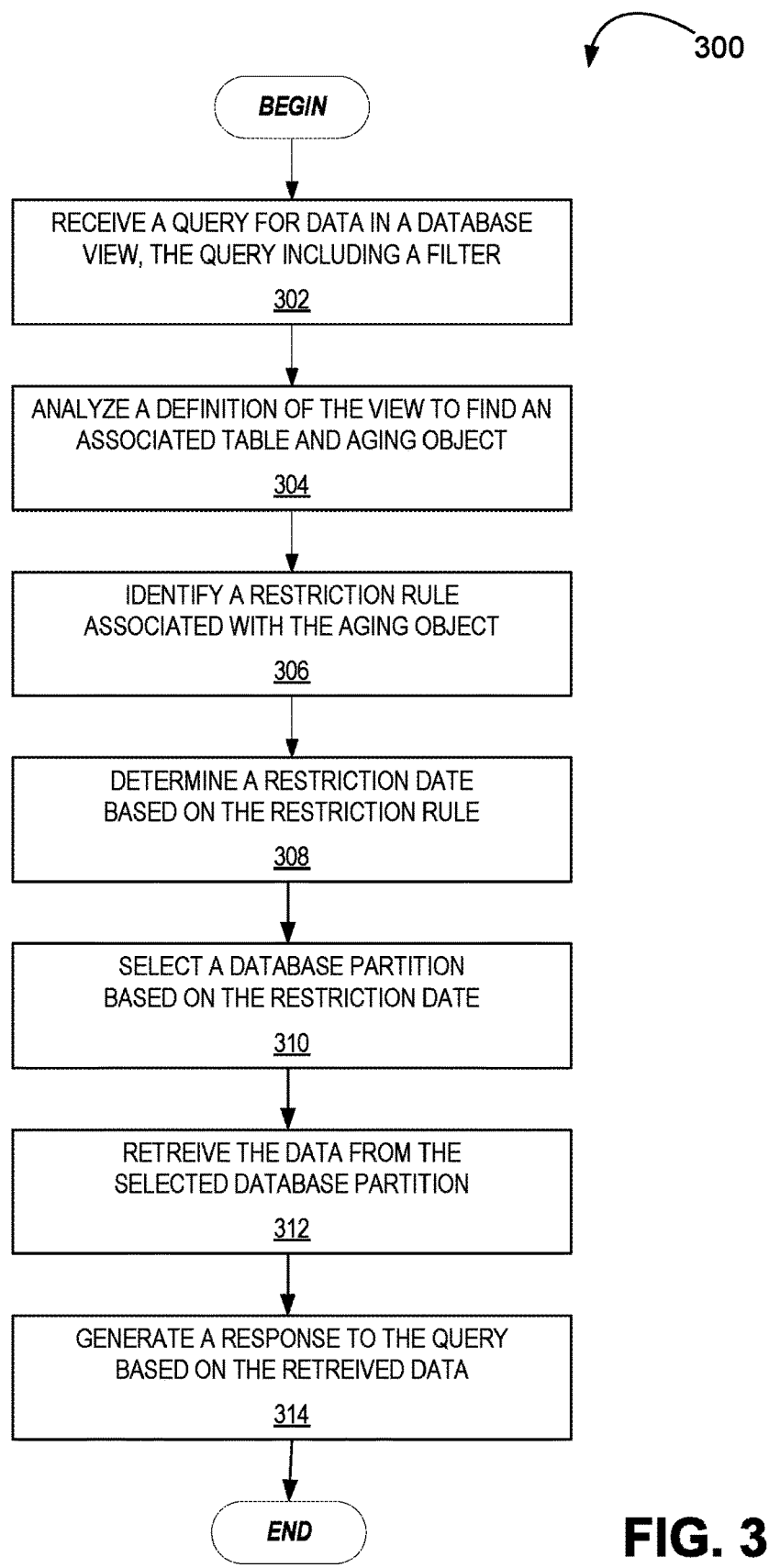
FIG. 3 is a flow diagram illustrating a method, consistent with some embodiments, for optimizing data access based on a database data aging functionality.

FIG. 3 is a flow diagram illustrating a method 300, consistent with some embodiments, for optimizing data access based on a database data aging functionality. The following description of FIG. 3 refers to elements from FIG. 1 and FIG. 2, which elements are referred to using the same identifiers.

At operation 302, a query (e.g., query 140) for data from a view of a database (e.g., database 170) is received (e.g., from application or query tool 130) by a generic infrastructure (e.g., generic infrastructure 150) enhanced (e.g., including aging infrastructure 206) with the ability to process application-specific logic (e.g., business logic) for a priori historical data restriction when accessing the database 170. Furthermore, the received query 140 contains at least one filtering parameter (e.g., filter 120) for retrieval of the data from the database 170.

At operation 304, a definition of the view (e.g., in database DDIC 216) is analyzed (e.g., a restriction handler 208 of restriction date infrastructure 214 of aging infrastructure 206 identifies annotations of the view) to determine a table of the database 170 that contributes to the view and an aging object (e.g., from aging object 212) associated with the table that contributes to the view. At operation 306, a restriction rule (e.g., a restriction rule view on database 170) associated with the aging object 212 is identified by restriction handler 208, e.g., based on an annotation of the view definition. At operation 308, a restriction date is determined for the aging object 212 based on the restriction rule associated with the aging object 212, e.g., the identified restriction rule view on the database 170 is executed to determine a rule minimum date to serve as the restriction date.

At operation 310, the generic infrastructure 150 selects a partition, from the plurality of partitions of database 170, based on a partition date associated with the selected partition being equal to or later than the determined restriction date. At operation 312, the queried data is retrieved from the selected partition according to the filter 120 of query 140. At operation 314, a response to the query 140 is generated based on the retrieved data from the selected partition of database 170.

Figure 4A:
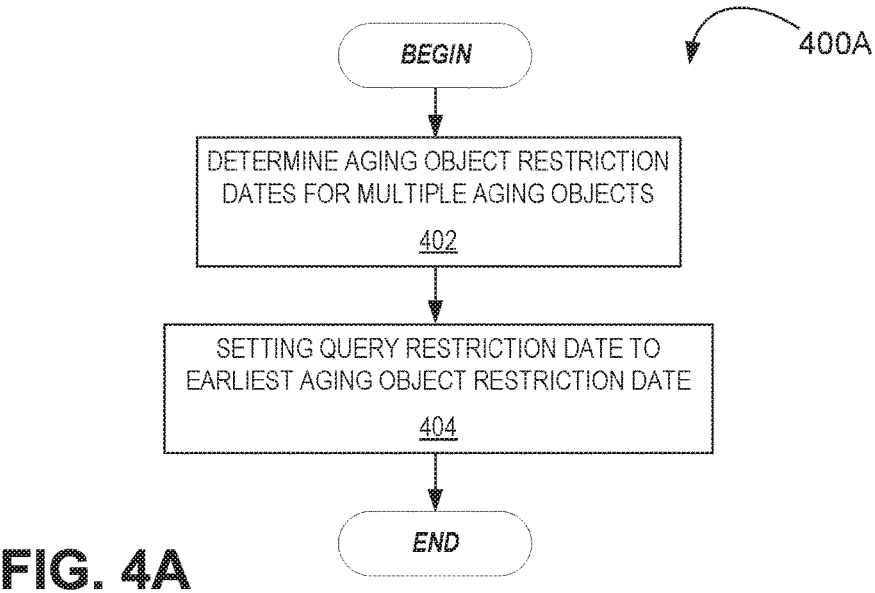
FIG. 4A is a flow diagram illustrating a method, consistent with some embodiments, for optimizing data access based on a database data aging functionality.

FIG. 4A is a flow diagram illustrating a method 400A, consistent with some embodiments, for optimizing data access based on a database data aging functionality. The following description of FIG. 4A refers to elements from FIG. 1 and FIG. 2, which elements are referred to using the same identifiers.

If a database view uses data from aging tables of multiple aging objects 212, the aging-object specific restriction dates have to be combined into an overall restriction date since only one restriction date may be specified in a SQL request (e.g., request 160) from database 170. Based on the view, that is the subject of query 140, using data from aging tables of multiple aging objects 212, determining the restriction date for the query 140 may further comprise:

At operation 402, determining (e.g., by restriction handler 208) aging object restriction dates (as described above) for each of the multiple aging objects 212 based on the respective rule restriction dates for each of the multiple aging objects 212, e.g., based on the respective restriction rules associated with each of the multiple aging objects 212; and, at operation 404, setting the restriction date for the query 140 to the earliest of the aging object restriction dates for each of the multiple aging objects 212.

In other words, in order to ensure that all relevant data is selected, the minimum of restrictions may be used and the above-noted formula (1), per aging object 212, for reading all relevant rows of tables that contribute to the view, may be extended to the following formula (2):

$$\min_{aging\ objects}(\text{statistics\_optimization}(\max_{rules}(\min_{filtered\ rule\ rows}(\text{DataAgingRelevant date})))).$$

If no restriction rule exists for an aging object 212 that is relevant for the view (e.g., based on the definition of the view), all data of database 170 may be read to correctly respond to query 140. This may be reflected in the above-noted formula (2) by a value '0001-01-01' as maximum of an empty set of rules.

Figure 4B:
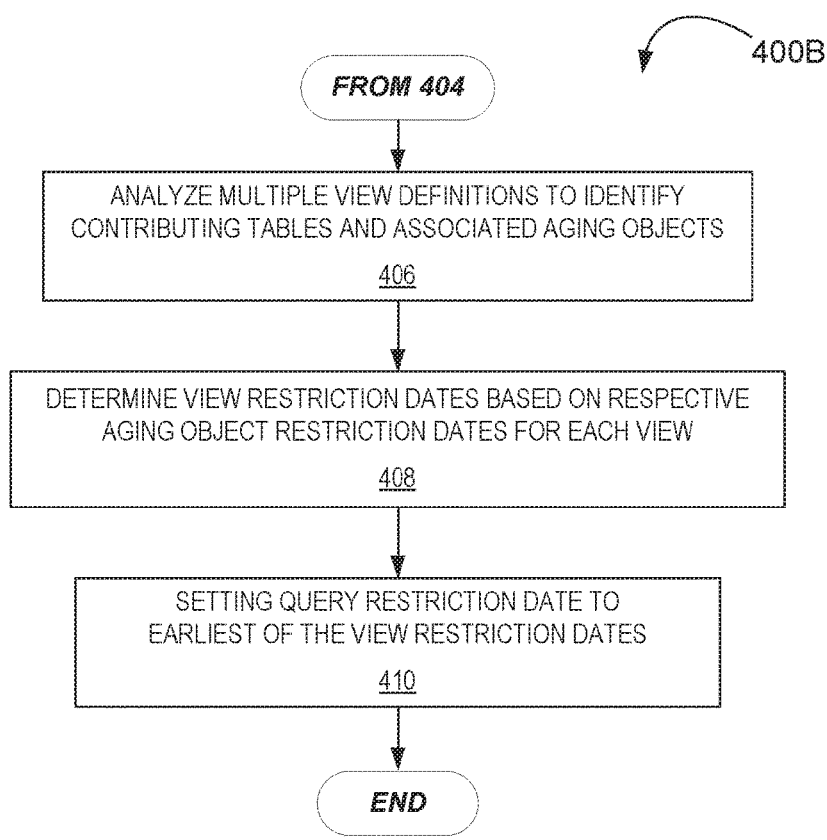
FIG. 4B is a flow diagram further illustrating a method, consistent with some embodiments, for optimizing data access based on a database data aging functionality.

FIG. 4B is a flow diagram illustrating a method 400B, consistent with some embodiments, for optimizing data access based on a database data aging functionality. The following description of FIG. 4B refers to elements from FIG. 1 and FIG. 2, which elements are referred to using the same identifiers.

Applications (e.g., application or query tool 130) may request data from multiple database views, connected by associations, in a single OData call (e.g., query 140), leading to a single SQL request (e.g., request 160) to database 170. As noted above, a conservative approach for combining restriction dates associated with each of the views is to determine a view restriction date for each of the involved views individually and then use the minimum of the view restriction dates as the overall restriction date in the single SQL request. Some associations between views, however, may ensure that the connected rows of the associated views have the same restriction date for a common aging object 212, and the restriction date for this aging object 212 may be determined for one view only since it also holds for the other view.

For example, in an OData request (e.g., query 140) for sales orders, the customer name is also retrieved via an association between views. A filter 120 on the sales order creation date limits the request to orders of the current year. Data aging may be used for sales orders but not for customer data. Therefore, in this situation, the restriction date determined for the sales order view (from the provided filter 120) may be used for the SQL request (e.g., request 160) from the joined sales order and customer views. Based on the query 140 requesting data from multiple views, each view using data from multiple aging tables of multiple aging objects 212, determining the restriction date for the query 140 may further comprise:

At operation 406, for each of the multiple views, analyzing a definition of the view (e.g., in database DDIC 216) to determine (e.g., by restriction handler 208) a table of the database 170 that contributes to the view and an aging object 212 associated with the table; at operation 408, determining view restriction dates for each of the multiple views based on the respective aging object restriction dates for each of the plurality of aging objects 212 associated with the table that contributes to the view; and, at operation 410, setting the restriction date (of query 140) to the earliest of the view restriction dates.

In other words, in order to ensure that all relevant data is selected, the minimum of restrictions may be used, and the above-noted formula (2), per queried view, for reading all relevant rows of tables that contribute to the combined views, may be extended to the following formula (3):

$$\min_{combined\ views}(\min_{aging\ objects}(\text{statistics\_optimization}(\max_{rules}(\min_{filtered\ rule\ rows}(\text{DataAgingRelevant date}))))).$$

If no rule exists for an aging object 212 that is relevant for one of the multiple views (e.g., based on examining the definition of the view), all data of database 170 may be read to correctly respond to query 140. This may be reflected in the above-noted formula (3) by a value '0001-01-01' as maximum of an empty set of rules.

Figure 5:
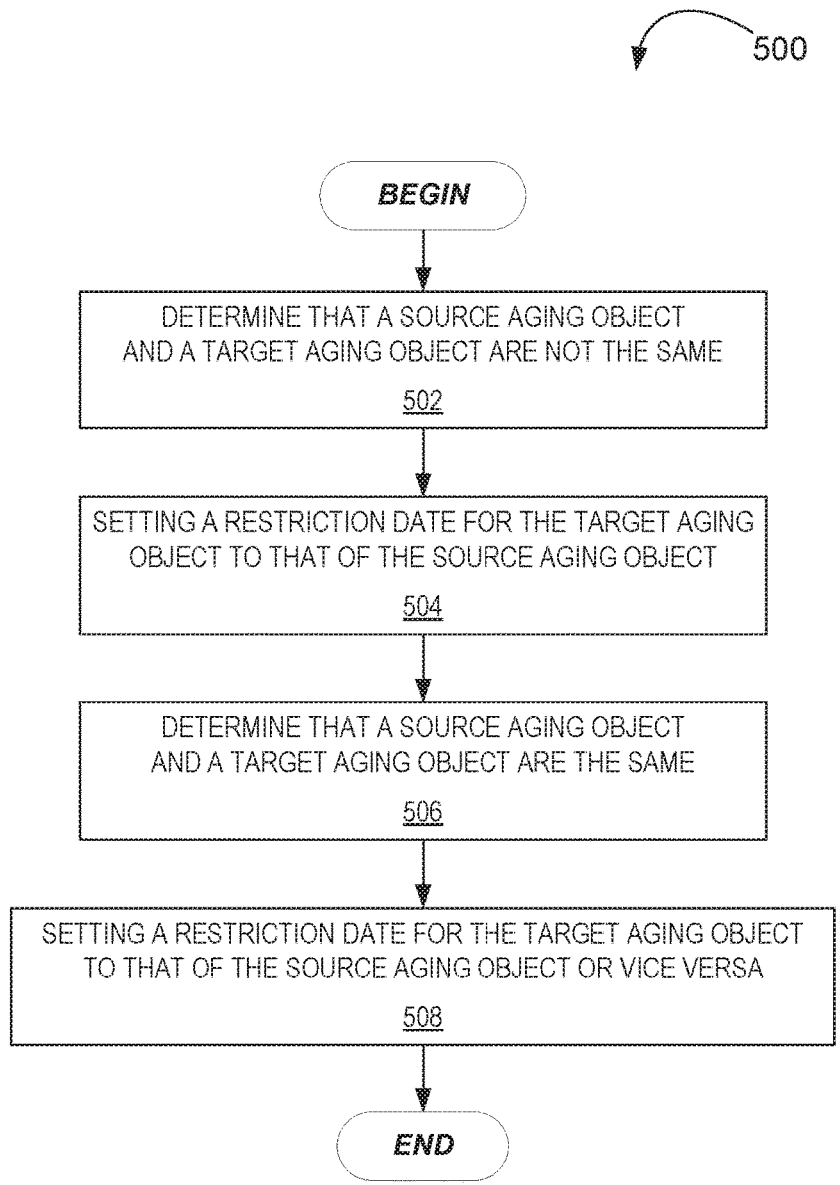
FIG. 5 is a flow diagram illustrating a method, consistent with some embodiments, for optimizing data access based on a database data aging functionality.

FIG. 5 is a flow diagram illustrating a method 500, consistent with some embodiments, for optimizing data access based on a database data aging functionality. The following description of FIG. 5 refers to elements from FIG. 1 and FIG. 2, which elements are referred to using the same identifiers.

Example 1: In an OData request (e.g., query 140) for data from a sales order item view, some sales order view fields are also retrieved via an association between the sales order view and the sales order item view. A filter 120 on the sales order view is given, but no filter 120 is provided for the associated sales order item view. Since the sales order view and sales order item view have the same aging object 212, and the used association is an association connecting rows of the same partitioning date (e.g., associated with the same aging object 212), a restriction date determined from the sales order item view filter 120 may be used for a combined SQL request (e.g., request 160) to database 170.

Example 2: In an OData (e.g., query 140) request for data associated with an instance of a first aging object 212 (e.g., document A), some fields of a related instance of a second aging object 212 (e.g., follow-up document B) are retrieved via an association of views. A filter 120 on document A is given, but no filter 120 is provided for the associated follow-up document B. Documents A and B don't have the same aging object 212 (e.g., the first and second aging objects are different). But the association (e.g., document B follows document A) connects them along a process chain. An aging logic ensures that document B is moved to historical data partitions after document A, and therefore document B has a later partitioning date. Accordingly, the restriction derived from the filter 120 for document A may be applied for a combined SQL request (e.g., request 160) to database 170.

This restriction date inheritance from document A to document B may be expressed by an annotation of the view of document B "@DataAging.inheritRestrictionDate" at the (exposed) association along which inheritance shall be enabled. However, care must be taken as this inheritance is specific to each of the aging objects 212 (e.g., first and second aging objects 212). For example, in the case of an association from a sales order item view to a view combining sales orders and production orders, only the restriction of the sales order aging object may be inherited along the association; the production order restriction may be derived separately since it is associated with a different aging object 212. Therefore the inheritance annotation in a view definition may also include a specification of a source and target aging object 212 it applies to. If the specified source and target aging objects 212 are different, the restriction date may only be inherited from the source aging object 212 to the target aging object 212. If the specified source and the target aging object 212 are equal, inheritance of a restriction date from the target aging object 212 to the source aging object 212 is possible as well.

Based on the definition of a view, of a plurality of views, including an annotation identifying, from a plurality of aging objects, a source aging object and a target aging object, determining the restriction date for the query 140 may further comprise:

At operation 502, determine (e.g., by restriction handler 208) that the source aging object and a target aging object are not the same; and at operation 504, setting the aging object restriction date for the target aging object to the aging object restriction date of the source aging object.

At operation 506, determine (e.g., by restriction handler 208) that the source aging object and a target aging object are the same; and at operation 508, setting the aging object restriction date for the target aging object to the aging object restriction date of the source aging object or setting the aging object restriction date for the source aging object to that of the target aging object based on the source aging object being the same as the target aging object.

Continuation of Example 1: In the sales order item view, the inheritance association to the sales order view is annotated as follows:

```
@DataAging.inheritRestrictionDate :
{ sourceAgingObject : 'SD_VBAK', targetAgingObject :
'SD_VBAK' }
_SalesOrder.
```

An OData request may retrieve quantity, material, etc., from the SalesOrderItem entity set (SoldToParty etc.) from the SalesOrder entity set via the OData association to_SalesOrder. The OData request may include a filter condition on the CreationDate of the SalesOrder, e.g. >='2015-01-01'. This OData request may result in an SQL request on combined views as follows:

```
SELECT soi.Material, so.SoldToParty, ...
FROM I_SalesOrderItem AS soi
LEFT OUTER JOIN I_SalesOrder AS so
ON ...
WHERE so.CreationDate >= '20150101'
INTO @result.
```

This request has a filter on I_SalesOrder but not on I_SalesOrderItem. Therefore, it would not normally be possible to restrict access to historical data for the combined view. However, because the joining of the views derives from the annotated association, a restriction date derived for I_SalesOrder and aging object 212 "SD_VBAK" is also valid for I_SalesOrderItem. Since no other aging objects 212 are involved, the date 2015-01-01 may be used, after applying statistic optimization, as the restriction date for access to historical data for the combined view.

Continuation of Example 2: In this more abstract example, the association from document A to document B view is annotated as follows:

```
@DataAging.inheritRestrictionDate :
{ sourceAgingObject : 'DOC_A', targetAgingObject : 'DOC_B' }
_DocumentB,
```

It may be assumed that, for documents A and B, only aging objects DOC_A and DOC_B are relevant. Then, in the following SQL request, the restriction date may be derived from the filter 120 on the creation date of document A alone, due to the annotation at the association:

```
SELECT a.AProperty1, b.Bproperty1, ...
FROM I_DocumentA AS a
LEFT OUTER JOIN I_DocumentB AS b
ON <condition of association _DocumentB>
WHERE a.ACreationDate IN @cdate
INTO @result.
```

Adding restrictions inherited along associations gives the following formula (4) for restrictions per aging object:

$$\max_{own+inherited}(\text{statistics\_optimization}(\max_{rules}(\min_{filtered\ rule\ rows}(\text{DataAgingRelevant date})))).$$

Now the minimum of restriction dates per view for selects from view combinations may be added to the formula, resulting in the following formula (5):

$$\min_{combined\ views}(\max_{own+inherited}(\text{statistics\_optimization}(\max_{rules}(\min_{filtered\ rule\ rows}(\text{DataAgingRelevant date}))))).$$

Finally, the minimum of all involved aging objects may be added, resulting in the following formula (6):

$$\min_{aging\ objects}(\min_{combined\ views}(\max_{own+inherited}(\text{statistics\_optimization}(\max_{rules}(\min_{filtered\ rule\ rows}(\text{DataAgingRelevant date})))))).$$

EXAMPLES

Example 1: a system comprising: a hardware processor; a database including a plurality of partitions with respective partition dates; and a memory including instructions which, when executed by the processor, cause the system to perform operations comprising: receiving a query for data from a view of the database, the query containing a filtering parameter for retrieval of the data; analyzing a definition of the view to determine, using the processor, a table of the database that contributes to the view and an aging object associated with the table; identifying, using the processor, a restriction rule associated with the aging object; determining, using the processor, a restriction date for the aging object based on the restriction rule; selecting a partition, from the plurality of partitions, based on the partition date of the partition being equal to or later than the restriction date; retrieving the data from the selected partition according to the filtering parameter; and responding to the query with the retrieved data.

Example 2: the system of example 1, wherein the aging object is a business object and the restriction rule for the aging object is based on the logic of a business rule associated with the business object.

Example 3: the system of any of examples 1-2, wherein the definition of the view includes an annotation indicating a date column of the view, the date column specifying an aging date of each instance of the aging object.

Example 4: the system of example 3, wherein to determine the restriction date based on the restriction rule the operations further comprise: determining, using the processor, that the filtering parameter comprises an earliest aging date for an instance of the aging object; and setting the restriction date to the earliest aging date.

Example 5: the system of example 3, wherein the aging date of each instance of the aging object comprises a creation date of each instance of the aging object.

Example 6: the system of any of examples 1-5, wherein: the definition of the view includes an annotation identifying a relevant column of the view and a restriction rule view for the aging object; the restriction rule view includes a relevant date column that specifies an aging date of each instance of the aging object; and the values in the relevant date column for each instance of the aging object are based on the respective values in the relevant column for each instance of the aging object.

Example 7: the system of example 6, wherein the relevant column of the view indicates a status of each instance of the aging object and to determine the restriction date based on the restriction rule the operations further comprise: determining, using the processor, a latest of the partition dates and designating the associated partition as the current partition; determining, using the processor, that the filtering parameter comprises an open status of an instance of the aging object; and setting the restriction date to the latest partition date.

Example 8: the system of any of examples 1-7, wherein the restriction rule associated with the aging object comprises a plurality of restriction rules and to determine the restriction date based on the restriction rule the operations further comprise: determining, using the processor, respective rule restriction dates for the aging object based on each of the plurality of restriction rules; and setting the restriction date to the latest of the rule restriction dates.

Example 9: the system of example 8, wherein the aging object comprises a plurality of aging objects and to determine the restriction date based on the restriction rule the operations further comprise: determining, using the processor, aging object restriction dates for each of the plurality of aging objects based on the respective rule restriction dates for each of the plurality of aging objects; and setting the restriction date to the earliest of the aging object restriction dates.

Example 10: the system of example 9, wherein the view comprises a plurality of views and to determine the restriction date based on the restriction rule the operations further comprise: for each of the plurality of views, analyzing a definition of the view to determine, using the processor, a table of the database that contributes to the view and an aging object associated with the table; determining, using the processor, view restriction dates for each of the plurality of views based on the aging object restriction dates for each of the plurality of aging objects associated with the table that contributes to the view; and setting the restriction date to the earliest of the view restriction dates.

Example 11: the system of example 10, wherein the definition of a view, of the plurality of views, includes an annotation identifying a source aging object and a target aging object of the plurality of aging objects and the operations further comprise: setting the aging object restriction date for the target aging object to that of the source aging object based on the source aging object being different from the target aging object; and setting the aging object restriction date for the target aging object to that of the source aging object or setting the aging object restriction date for the source aging object to that of the target aging object based on the source aging object being the same as the target aging object.

Example 12: a computerized method for data access from a database including a plurality of partitions with respective partition dates, the method comprising: receiving a query for data from a view of the database, the query containing a filtering parameter for retrieval of the data; analyzing a definition of the view to determine, using a processor, a table of the database that contributes to the view and an aging object associated with the table; identifying, using the processor, a restriction rule associated with the aging object; determining, using the processor, a restriction date for the aging object based on the restriction rule; selecting a partition, from the plurality of partitions, based on the partition date of the partition being equal to or later than the restriction date; retrieving the data from the selected partition according to the filtering parameter; and responding to the query with the retrieved data.

Example 13: the method of example 12, wherein the definition of the view includes an annotation indicating a date column of the view, the date column specifying an aging date of each instance of the aging object, and to determine the restriction date based on the restriction rule the method further comprises: determining, using the processor, that the filtering parameter comprises an earliest aging date for an instance of the aging object; and setting the restriction date to the earliest aging date.

Example 14: the method of any of examples 12-13, wherein: the definition of the view includes an annotation identifying a relevant column of the view and a restriction rule view for the aging object; the restriction rule view includes a relevant date column that specifies an aging date of each instance of the aging object; and the values in the relevant date column for each instance of the aging object are based on the respective values in the relevant column for each instance of the aging object.

Example 15: the method of example 14, wherein the relevant column of the view indicates a status of each instance of the aging object and to determine the restriction date based on the restriction rule the method further comprises: determining, using the processor, a latest of the partition dates and designating the associated partition as the current partition; determining, using the processor, that the filtering parameter comprises an open status of an instance of the aging object; and setting the restriction date to the latest partition date.

Example 16: the method of any of examples 12-15, wherein the restriction rule associated with the aging object comprises a plurality of restriction rules and to determine the restriction date based on the restriction rule the method further comprises: determining, using the processor, respective rule restriction dates for the aging object based on each of the plurality of restriction rules; and setting the restriction date to the latest of the rule restriction dates.

Example 17: the method of example 16, wherein the aging object comprises a plurality of aging objects and to determine the restriction date based on the restriction rule the method further comprises: determining, using the processor, aging object restriction dates for each of the plurality of aging objects based on the respective rule restriction dates for each of the plurality of aging objects; and setting the restriction date to the earliest of the aging object restriction dates.

Example 18: the method of example 17, wherein the view comprises a plurality of views and to determine the restriction date based on the restriction rule the method further comprises: for each of the plurality of views, analyzing a definition of the view to determine, using the processor, a table of the database that contributes to the view and an aging object associated with the table; determining, using the processor, view restriction dates for each of the plurality of views based on the aging object restriction dates for each of the plurality of aging objects associated with the table that contributes to the view; and setting the restriction date to the earliest of the view restriction dates.

Example 19: the method of example 18, wherein the definition of a view, of the plurality of views, includes an annotation identifying a source aging object and a target aging object of the plurality of aging objects and the method further comprises: setting the aging object restriction date for the target aging object to that of the source aging object based on the source aging object being different from the target aging object; and setting the aging object restriction date for the target aging object to that of the source aging object or setting the aging object restriction date for the source aging object to that of the target aging object based on the source aging object being the same as the target aging object.

Example 20: a non-transitory machine-readable storage medium storing instructions which, when executed by at least one processor of a machine, cause the machine to perform operations comprising: receiving a query for data from a view of the database, the database including a plurality of partitions with respective partition dates and the query containing a filtering parameter for retrieval of the data; analyzing a definition of the view to determine, using the processor, a table of the database that contributes to the view and an aging object associated with the table; identifying, using the processor, a restriction rule associated with the aging object; determining, using the processor, a restriction date for the aging object based on the restriction rule; selecting a partition, from the plurality of partitions, based on the partition date of the partition being equal to or later than the restriction date: retrieving the data from the selected partition according to the filtering parameter; and responding to the query with the retrieved data.

Example 21: the non-transitory machine-readable storage medium of example 20 further storing instructions which, when executed by the at least one processor, cause the machine to perform operation comprising the operations of the method of any of examples 13-19.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a stand-alone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application programming interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 1-5 are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art may readily understand how to implement the subject matter in different contexts from the disclosure contained herein.

Software Architecture

Figure 6:
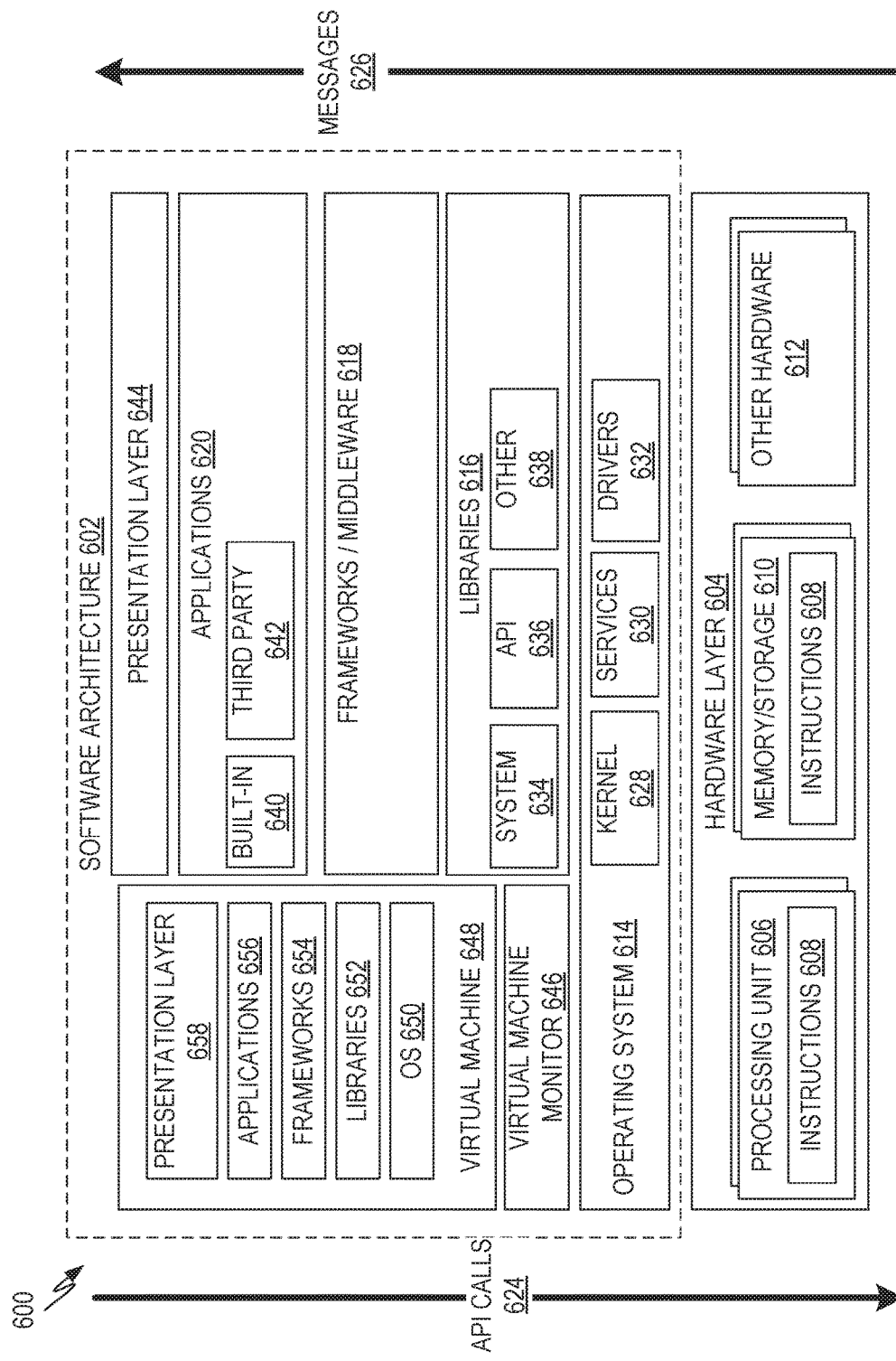
FIG. 6 is a block diagram illustrating an example of a software architecture that may be installed on a machine, according to some example embodiments.

FIG. 6 is a block diagram 600 illustrating an example of a software architecture 602 that may be installed on a machine, according to some example embodiments. FIG. 6 is merely a non-limiting example of a software architecture, and it will be appreciated that many other architectures may be implemented to facilitate the functionality described herein. The software architecture 602 may be executing on hardware such as a machine 700 of FIG. 7 that includes, among other things, processors 710, memory/storage 730, and/O components 750. A representative hardware layer 604 is illustrated and may represent, for example, the machine 700 of FIG. 7. The representative hardware layer 604 comprises one or more processing units 606 having associated executable instructions 608. The executable instructions 608 represent the executable instructions of the software architecture 602, including implementation of the methods, modules, and so forth of FIGS. 1-5. The hardware layer 604 also includes memory or storage modules 610, which also have the executable instructions 608. The hardware layer 604 may also comprise other hardware 612, which represents any other hardware of the hardware layer 604, such as other hardware illustrated as part of machine 700.

In the example architecture of FIG. 6, the software architecture 602 may be conceptualized as a stack of layers, where each layer provides particular functionality. For example, the software architecture 602 may include layers such as an operating system 614, libraries 616, frameworks/middleware 618, applications 620, and a presentation layer 644. Operationally, the applications 620 or other components within the layers may invoke API calls 624 through the software stack and receive a response, returned values, and so forth (illustrated as messages 626) in response to the API calls 624. The layers illustrated are representative in nature, and not all software architectures have all layers. For example, some mobile or special purpose operating systems may not provide a frameworks/middleware 618 layer, while others may provide such a layer. Other software architectures may include additional or different layers.

The operating system 614 may manage hardware resources and provide common services. The operating system 614 may include, for example, a kernel 628, services 630, and drivers 632. The kernel 628 may act as an abstraction layer between the hardware and the other software layers. For example, the kernel 628 may be responsible for memory management, processor management (e.g., scheduling), component management, networking, security settings, and so on. The services 630 may provide other common services for the other software layers. The drivers 632 may be responsible for controlling or interfacing with the underlying hardware. For instance, the drivers 632 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 616 may provide a common infrastructure that may be utilized by the applications 620 and/or other components and/or layers. The libraries 616 typically provide functionality that allows other software modules to perform tasks in an easier fashion than by interfacing directly with the underlying operating system 614 functionality (e.g., kernel 628, services 630, or drivers 632). The libraries 616 may include system libraries 634 (e.g., C standard library) that may provide functions such as memory allocation functions, string manipulation functions, mathematic functions, and the like. In addition, the libraries 616 may include API libraries 636 such as media libraries (e.g., libraries to support presentation and manipulation of various media formats such as MPEG4, H.264, MP3, AAC, AMR, JPG. PNG), graphics libraries (e.g., an OpenGL framework that may be used to render 2D and 3D graphic content on a display), database libraries (e.g., SQLite, which may provide various relational database functions), web libraries (e.g., WebKit, which may provide web browsing functionality), and the like. The libraries 616 may also include a wide variety of other libraries 638 to provide many other APIs to the applications 620 and other software components/modules.

The frameworks 618 (also sometimes referred to as middleware) may provide a higher-level common infrastructure that may be utilized by the applications 620 or other software components/modules. For example, the frameworks 618 may provide various graphic user interface (GUI) functions, high-level resource management, high-level location services, and so forth. The frameworks 618 may provide a broad spectrum of other APIs that may be utilized by the applications 620 and/or other software components/modules, some of which may be specific to a particular operating system or platform.

The applications 620 include built-in applications 640 and/or third-party applications 642. Examples of representative built-in applications 640 may include, but are not limited to, a contacts application, a browser application, a book reader application, a location application, a media application, a messaging application, or a game application. The third-party applications 642 may include any of the built-in applications 640, as well as a broad assortment of other applications. In a specific example, a third-party application 642 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party applications 642 may invoke the API calls 624 provided by the mobile operating system, such as the operating system 614, to facilitate functionality described herein.

The applications 620 may utilize built-in operating system functions (e.g., kernel 628, services 630, or drivers 632), libraries (e.g., system libraries 634, API libraries 636, and other libraries 638), or frameworks/middleware 618 to create user interfaces to interact with users of the system. Alternatively, or additionally, in some systems, interactions with a user may occur through a presentation layer, such as the presentation layer 644. In these systems, the application/module "logic" may be separated from the aspects of the application/module that interact with the user.

Some software architectures utilize virtual machines. In the example of FIG. 6, this is illustrated by a virtual machine 648. A virtual machine creates a software environment where applications/modules may execute as if they were executing on a hardware machine (e.g., the machine 700 of FIG. 7, for example). A virtual machine 648 is hosted by a host operating system (e.g., operating system 614) and typically, although not always, has a virtual machine monitor 646, which manages the operation of the virtual machine 648 as well as the interface with the host operating system (e.g., operating system 614). A software architecture executes within the virtual machine 648, such as an operating system 650, libraries 652, frameworks/middleware 654, applications 656, and a presentation layer 658. These layers of software architecture executing within the virtual machine 648 may be the same (or different) as corresponding layers previously described.

Machine Architecture and Machine-Readable Medium

Figure 7:
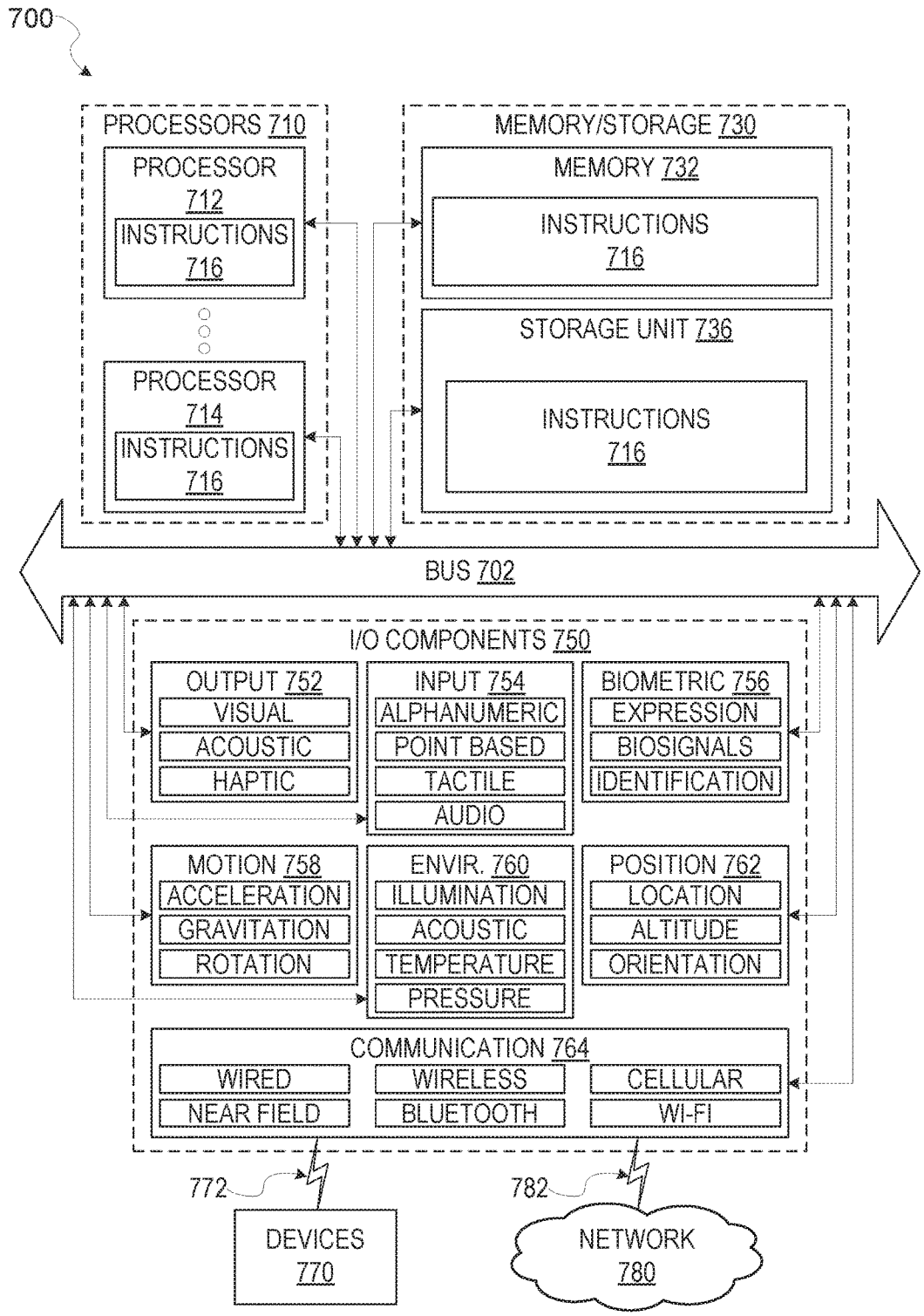
FIG. 7 illustrates a diagrammatic representation of a machine in the form of a computer system within which a set of instructions may be executed for causing the machine to perform any one or more of the methodologies discussed herein.

FIG. 7 illustrates a diagrammatic representation of a machine in the form of a computer system within which a set of instructions may be executed for causing the machine to perform any one or more of the methodologies discussed herein. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. For example the instructions 716 may cause the machine 700 to execute the method 300 of FIG. 3. Additionally, or alternatively, the instructions 716 may implement the methods of FIG. 4A, FIG. 4B and/or FIG. 5. The instructions 716 transform the general, non-programmed machine 700 into a particular machine 700 programmed to carry out the described and illustrated functions in the manner described.

In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory/storage 730, and I/O components 750, which may be configured to communicate with each other such as via a bus 702. In an example embodiment, the processors 710 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 712 and a processor 714 that may execute the instructions 716. The term "processor" is intended to include multi-core processors that may comprise two or more independent processors (sometimes referred to as "cores") that may execute instructions contemporaneously. Although FIG. 7 shows multiple processors 710, the machine 700 may include a single processor with a single core, a single processor with multiple cores (e.g., a multi-core processor), multiple processors with a single core, multiple processors with multiples cores, or any combination of processors and cores.

The memory/storage 730 may include a memory 732, such as a main memory, or other memory storage, and a storage unit 736, both accessible to the processors 710 such as via the bus 702. The storage unit 736 and the memory 732 store the instructions 716 embodying any one or more of the methodologies or functions described herein. The instructions 716 may also reside, completely or partially, within the memory 732, within the storage unit 736, within at least one of the processors 710 (e.g., within the processor's cache memory), or any suitable combination thereof, during execution thereof by the machine 700. Accordingly, the memory 732, the storage unit 736, and the memory of the processors 710 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), or any suitable combination thereof. The term "machine-readable medium" should be taken to include a single medium or multiple media (e.g., a centralized or distributed database, or associated caches and servers) able to store the instructions 716. The term "machine-readable medium" shall also be taken to include any medium, or combination of multiple media, that is capable of storing instructions (e.g., instructions 716) for execution by a machine (e.g., machine 700), such that the instructions, when executed by one or more processors of the machine (e.g., processors 710), cause the machine to perform any one or more of the methodologies described herein. Accordingly, a "machine-readable medium" refers to a single storage apparatus or device, as well as "cloud-based" storage systems or storage networks that include multiple storage apparatus or devices.

The I/O components 750 may include a wide variety of components to receive input, provide output, produce output, transmit information, exchange information, capture measurements, and so on. The specific I/O components 750 that are included in a particular machine will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion and the grouping is in no way limiting. In various example embodiments, the I/O components 750 may include output components 752 and input components 754. The output components 752 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 750 may include biometric components 756, motion components 758, environmental components 760, or position components 762, among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 762 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or another suitable device to interface with the network 780. In further examples, the communication components 764 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., a peripheral device coupled via a USB).

Moreover, the communication components 764 may detect identifiers or include components operable to detect identifiers. For example, the communication components 764 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 764, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 780 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., hypertext transfer protocol (HTTP)). Similarly, the instructions 716 may be transmitted or received using a transmission medium via the coupling 772 (e.g., a peer-to-peer coupling) to the devices 770. The term "transmission medium" shall be taken to include any intangible medium that is capable of storing, encoding, or carrying the instructions 716 for execution by the machine 700, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter described herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to such claims.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The invention claimed is:

1. A system comprising:
a hardware processor;
a database including a plurality of partitions with respective partition dates; and
a memory including instructions which, when executed by the processor, cause the system to perform operations comprising:
receiving a query for data from a view of the database, the query containing a filtering parameter for retrieval of the data;
analyzing a definition of the view to determine a first table of the database that contributes to the view and a first aging object associated with the first table, and a second table of the database that contributes to the view and a second aging object associated with the second table;
identifying a first restriction rule associated with the first aging object and a second restriction rule associated with the second aging object;
executing the first restriction rule associated with the first aging object to determine a first restriction date for the first aging object;
executing the second restriction rule associated with the second aging object to determine a second restriction date for the second aging object;
generating an optimized restriction date based on a minimum rule date determined from the first restriction date for the first aging object and the second restriction date for the second aging object;
selecting a partition, from the plurality of partitions, based on the partition date of the partition being equal to or later than the optimized restriction date;
retrieving the data from the selected partition according to the filtering parameter; and
responding to the query with the retrieved data.

2. The system of claim 1, wherein the first aging object is a business object and the first restriction rule for the first aging object is based on the logic of a business rule associated with the business object.

3. The system of claim 1, wherein the definition of the view includes an annotation indicating a date column of the view, the date column specifying an aging date of each instance of the first aging object.

4. The system of claim 3, wherein generating an optimized restriction date further comprises:
determining, that the filtering parameter comprises an earliest aging date for an instance of the first aging object; and
setting the first restriction date to the earliest aging date.

5. The system of claim 3, wherein the aging date of each instance of the first aging object comprises a creation date of each instance of the first aging object.

6. The system of claim 1, wherein:
the definition of the view includes an annotation identifying a relevant column of the view and a first restriction rule view for the first aging object;

the first restriction rule view includes a relevant date column that specifies an aging date of each instance of the first aging object; and values in the relevant date column for each instance of the first aging object are based on respective values in the relevant column for each instance of the first aging object.

7. The system of claim 6, wherein the relevant column of the view indicates a status of each instance of the first aging object, and determining the first restriction date based on executing the first restriction rule comprises:

determining a latest of the partition dates and designating an associated partition as the current partition;

determining that the filtering parameter comprises an open status of an instance of the first aging object; and setting the first restriction date to the latest partition date.

8. The system of claim 1, wherein the first restriction rule associated with the first aging object comprises a plurality of restriction rules, and determining the first restriction date based on executing the first restriction rule comprises:

determining respective rule restriction dates for the determining aging object based on each of the plurality of restriction rules; and setting the determining restriction date to the latest of the rule restriction dates.

9. The system of claim 8, wherein the first aging object comprises a plurality of aging objects, and to determine the first restriction date based on executing the first restriction rule comprises:

determining aging object restriction dates for each of the plurality of aging objects based on the respective rule restriction dates for each of the plurality of aging objects; and setting the first restriction date to the earliest of the aging object restriction dates.

10. The system of claim 9, wherein the view comprises a plurality of views, and to determine the first restriction date based on executing the first restriction rule comprises:

determining view restriction dates for each of the plurality of views based on the aging object restriction dates for each of the plurality of aging objects associated with the table that contributes to the view; and setting the first restriction date to the earliest of the view restriction dates.

11. The system of claim 10, wherein the definition of the view, of the plurality of views, includes an annotation identifying a source aging object and a target aging object of the plurality of aging objects, and the operations further comprise:

setting the aging object restriction date for the target aging object to that of the source aging object based on the source aging object being different from the target aging object; and setting the aging object restriction date for the target aging object to that of the source aging object or setting the aging object restriction date for the source aging object to that of the target aging object based on the source aging object being the same as the target aging object.

12. A computerized method for data access from a database including a plurality of partitions with respective partition dates, the method comprising:

receiving a query for data from a view of the database, the query containing a filtering parameter for retrieval of the data;

analyzing a definition of the view to determine a first table of the database that contributes to the view and a first aging object associated with the first table, and a second table of the database that contributes to the view and a second aging object associated with the second table;

identifying a first restriction rule associated with the first aging object and a second restriction rule associated with the second aging object;

executing the first restriction rule associated with the first aging object to determine a first restriction date for the first aging object;

executing the second restriction rule associated with the second aging object to determine a second restriction date for the second aging object;

generating an optimized restriction date based on a minimum rule date determined from the first restriction date for the first aging object and the second restriction date for the second aging object;

selecting a partition, from the plurality of partitions, based on the partition date of the partition being equal to or later than the optimized restriction date;

retrieving the data from the selected partition according to the filtering parameter; and responding to the query with the retrieved data.

13. The method of claim 12, wherein the definition of the view includes an annotation indicating a date column of the view, the date column specifying an aging date of each instance of the first aging object, and generating an optimized restriction further comprises:

determining, that the filtering parameter comprises an earliest aging date for an instance of the first aging object; and setting the first restriction date to the earliest aging date.

14. The method of claim 12, wherein:

the definition of the view includes an annotation identifying a relevant column of the view and a first restriction rule view for the first aging object;

the first restriction rule view includes a relevant date column that specifies an aging date of each instance of the first aging object; and values in the relevant date column for each instance of the first aging object are based on respective values in the relevant column for each instance of the first aging object.

15. The method of claim 14, wherein the relevant column of the view indicates a status of each instance of the first aging object, and determining the first restriction date based on executing the first restriction rule comprises:

determining a latest of the partition dates and designating an associated partition as the current partition;

determining that the filtering parameter comprises an open status of an instance of the first aging object; and setting the first restriction date to the latest partition date.

16. The method of claim 12, wherein the first restriction rule associated with the first aging object comprises a plurality of restriction rules, and determining the first restriction date based on executing the first restriction rule comprises:

determining respective rule restriction dates for the determining aging object based on each of the plurality of restriction rules; and setting the determining restriction date to the latest of the rule restriction dates.

17. The method of claim 16, wherein the first aging object comprises a plurality of aging objects, and to determine the first restriction date based on executing the first restriction rule comprises:

determining aging object restriction dates for each of the plurality of aging objects based on the respective rule restriction dates for each of the plurality of aging objects; and setting the first restriction date to the earliest of the aging object restriction dates.

18. The method of claim 17, wherein the view comprises a plurality of views, and to determine the first restriction date based on executing the first restriction rule comprises:

determining view restriction dates for each of the plurality of views based on the aging object restriction dates for each of the plurality of aging objects associated with the table that contributes to the view; and setting the first restriction date to the earliest of the view restriction dates.

19. The method of claim 18, wherein the definition of a view, of the plurality of views, includes an annotation identifying a source aging object and a target aging object of the plurality of aging objects, and the method further comprises:

setting the aging object restriction date for the target aging object to that of the source aging object based on the source aging object being different from the target aging object; and setting the aging object restriction date for the target aging object to that of the source aging object or setting the aging object restriction date for the source aging object to that of the target aging object based on the source aging object being the same as the target aging object.

20. A non-transitory machine-readable storage medium storing instructions which, when executed by at least one processor of a machine, cause the machine to perform operations comprising:

receiving a query for data from a view of the database, the query containing a filtering parameter for retrieval of the data;

analyzing a definition of the view to determine a first tab of the database that contributes to the view and a first aging object associated with the first table, and a second table of the database that contributes to the view and a second aging object associated with the second table;

identifying a first restriction rule associated with the first aging object and a second restriction rule associated with the second aging object;

executing the first restriction rule associated with the first aging object to determine a first restriction date for the first aging object;

executing the second restriction rule associated with the second aging object to determine a second restriction date for the second aging object;

generating an optimized restriction date based on a minimum rule date determined from the first restriction date for the first aging object and the second restriction date for the second aging object;

selecting a partition, from the plurality of partitions, based on the partition date of the partition being equal to or later than the optimized restriction date;

retrieving the data from the selected partition according to the filtering parameter; and responding to the query with the retrieved data.

* * * * *